No. 876,730. PATENTED JAN. 14, 1908.
N. RUSHE.
CAR BRAKE OPERATING MECHANISM.
APPLICATION FILED OCT. 28, 1907.

Witnesses
Samuel Payne
N. H. Butler

Inventor
Nicholas Rushe,
By H. C. Evert & Co.
Attorney

UNITED STATES PATENT OFFICE.

NICKLOS RUSHE, OF RANKIN, PENNSYLVANIA.

CAR-BRAKE-OPERATING MECHANISM.

No. 876,730.　　　　Specification of Letters Patent.　　　　Patented Jan. 14, 1908.

Application filed October 28, 1907. Serial No. 399,444.

*To all whom it may concern:*

Be it known that I, NICKLOS RUSHE, a citizen of the United States of America, residing at Rankin, in the county of Allegheny and State of Pennsylvania, have invented certain new and useful Improvements in Car-Brake-Operating Mechanisms, of which the following is a specification, reference being had therein to the accompanying drawings.

This invention relates to car brake operating mechanisms, particularly designed for freight cars of steam railways.

The primary object of the invention is, to provide a simple and inexpensive mechanism for retaining the brake handle or wheel in a fixed position after it has been moved, without the use of a ratchet wheel, pawl, dog, or similar device.

Another important object of my invention is, to provide a mechanism of the above type that will insure perfect safety of a brakeman, when operating the same, thus obviating many accidents due to the slipping and sudden releasing of brake mechanism.

The invention comprehends a cable or chain drum, a gear wheel meshing with a worm, brackets for supporting the same, and a main operating shaft, all these elements being arranged at the top and end of a freight car, whereby they can be easily actuated by a brakeman.

The invention will be presently described in detail and reference will now be had to a drawing forming part of this specification.

Figure 1:
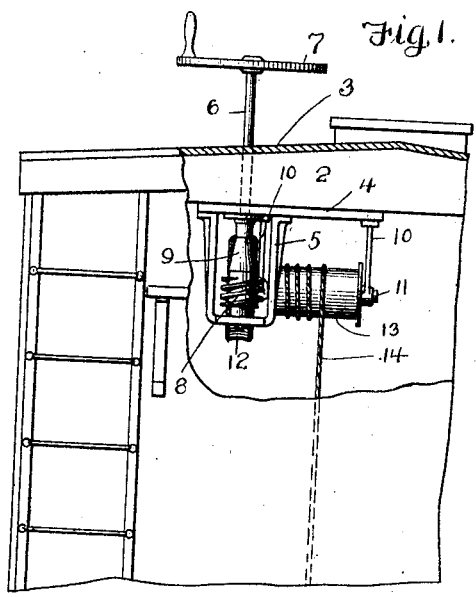
Figure 2:
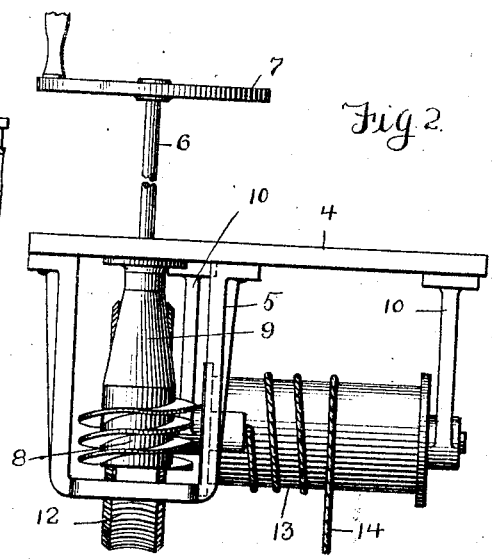
Figure 3:
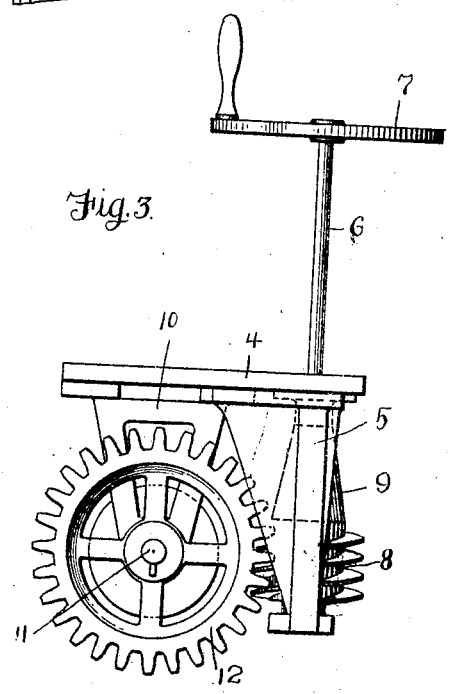
Figure 4:
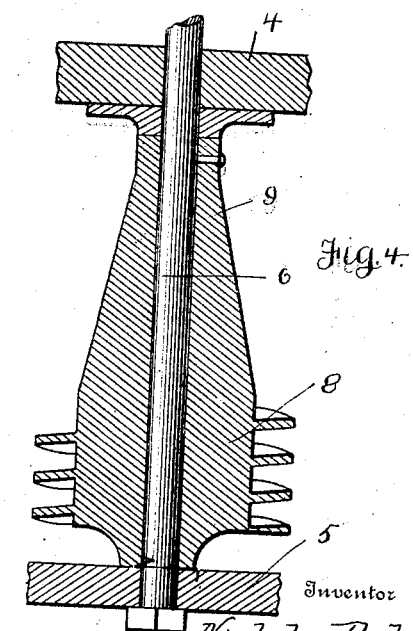

In the drawing Figure 1 is an end view of a portion of a car, partly broken away to illustrate the brake mechanism, Fig. 2 is an enlarged front elevation of the mechanism, Fig. 3 is a side elevation of the same, and Fig. 4 is a vertical sectional view of the worm.

Reference first being had to Fig. 1 of the drawings and then to the remaining figures, the reference numeral 1 designates a portion of a car having roof beams 2, and a roof 3. Suspended from the roof beams 2 or a plate 4 carried thereby is a metallic hanger or bracket 5, and journaled in this bracket is a vertically disposed shaft 6 having its upper end extending through one of the beams 2 and the roof 3, and provided with a brake wheel or handle 7. Upon the shaft 6, within the bracket 5, is fixed a reinforced worm 8, the reinforcement comprising a tapering integral sleeve 9 adapted to relieve the worm 8 of any strain due to moving the shaft 6. The roof beams 2 or the plate 4, contiguous to the bracket 5, are provided with depending brackets 10, and journaled in said brackets is a horizontal shaft 11, one end of said shaft being provided with a gear wheel 12, meshing with the worm 8. Upon the shaft 11, between the brackets 10, is mounted a cable or chain drum 13, to which is suitably secured a chain or cable 14. This chain or cable 14 is adapted to extend down through the car and connect with the brake rigging (not shown) beneath the car.

It is apparent from the construction just described that it is only necessary to turn the brake handle or wheel 7 to wind or release the chain or cable 14, it being impossible for a movement of the drum 13 to affect the worm, the shaft 6 or the handle or wheel 7. Since the mechanism is housed within the car 1, it is not susceptible to deterioration from the forces of nature, or to breakage by ordinary use. The mechanism has been designed solely for cars and as such will be hereinafter claimed.

Having now described my invention, what I claim as new is:—

1. In a car brake operating mechanism, the combination with a car and the roof thereof, of brackets suspended from said roof, a shaft journaled in one of said brackets and extending above said roof, a brake wheel carried thereby, a reinforced worm mounted upon said shaft, said reinforcement comprising a tapering sleeve, a shaft journaled in the other of said brackets, a gear wheel carried by said shaft and meshing with said worm, a drum carried by said shaft, and a chain or cable connecting with said drum, substantially as, and for the purpose described.

2. In a car brake operating mechanism, the combination with a car and the roof thereof, of brackets suspended from said roof, a vertically disposed shaft journaled in one of said brackets, a reinforced worm carried thereby, a horizontal shaft journaled in the other of said brackets, a gear wheel carried by said shaft and meshing with said worm, a drum fixed on said shaft, and a chain or cable connecting with said drum, substantially as described.

In testimony whereof I affix my signature in the presence of two witnesses.

NICKLOS RUSHE.

Witnesses:
　MAX H. SROLOVITZ,
　D. D. LYNCH.